Jan. 31, 1933.  E. H. SMYTHE  1,895,494
SOUND REPRODUCER
Filed Aug. 17, 1926  5 Sheets-Sheet 1
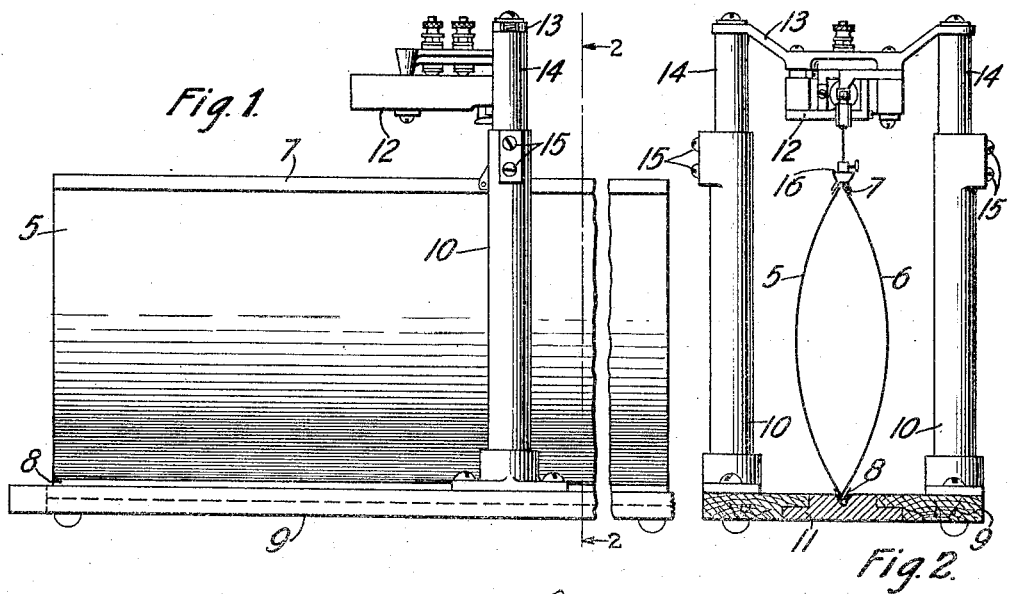
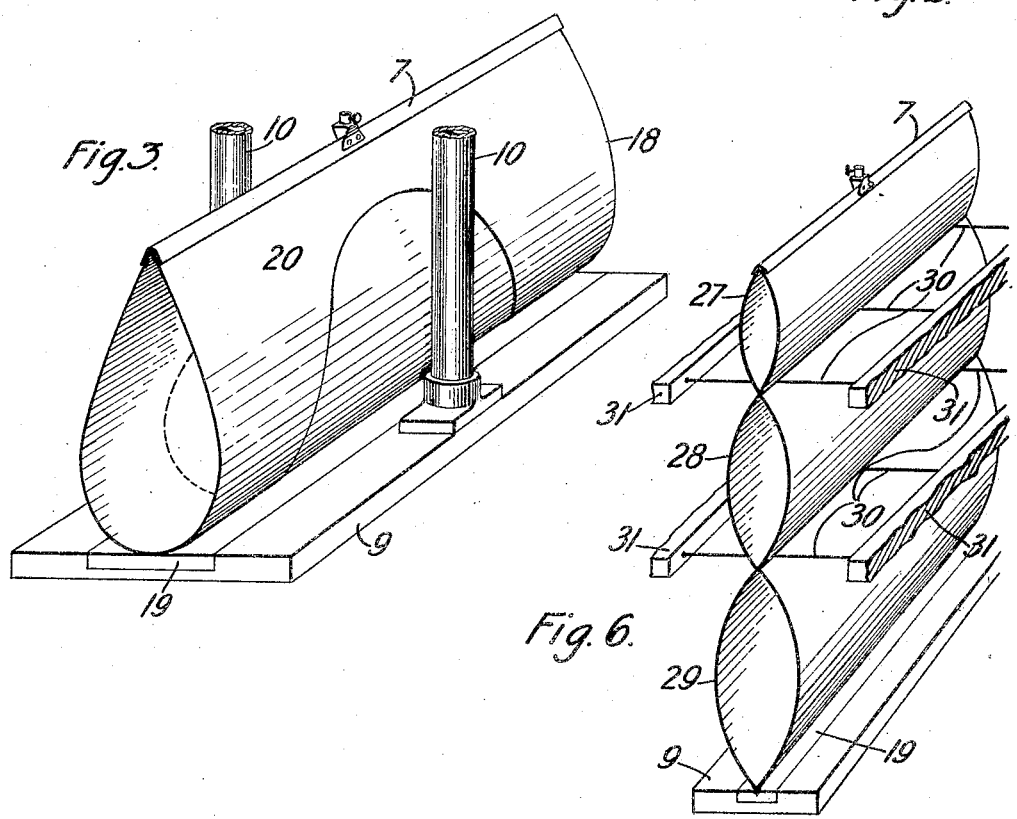
Inventor:
Edwin H. Smythe
by J. E. Roberts
Attorney

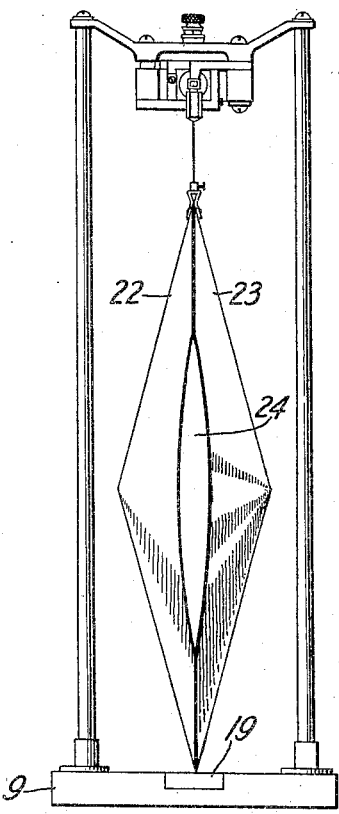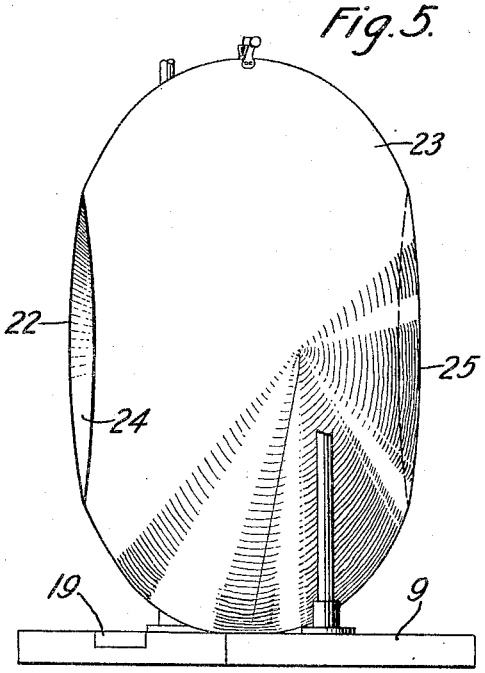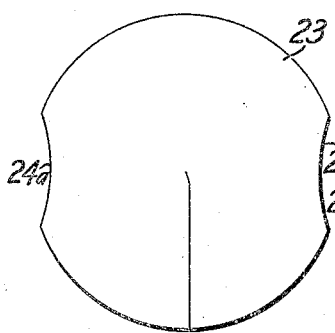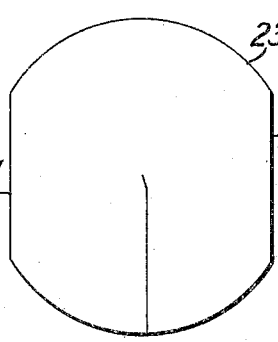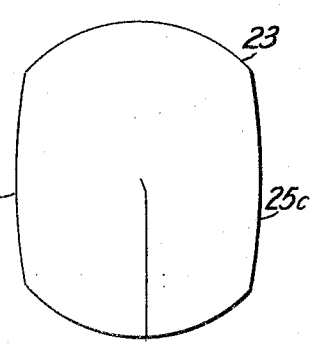

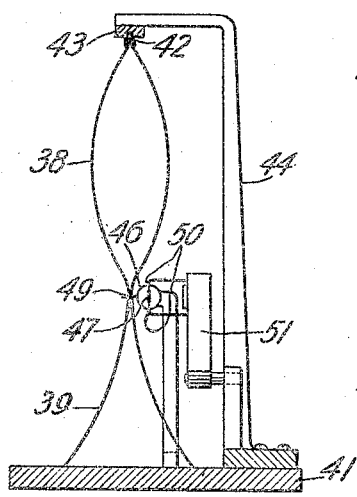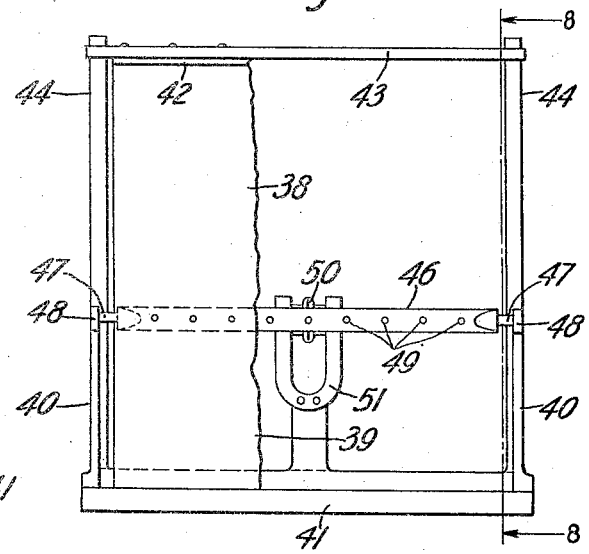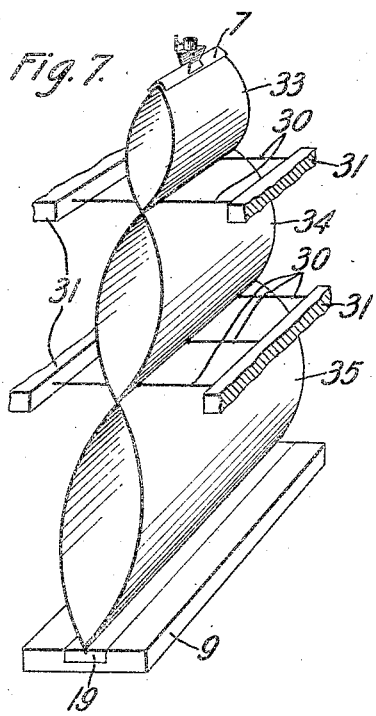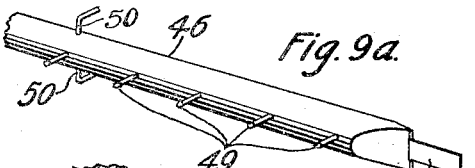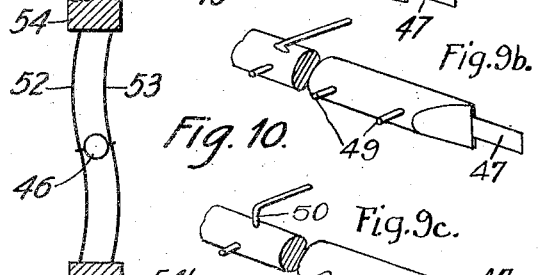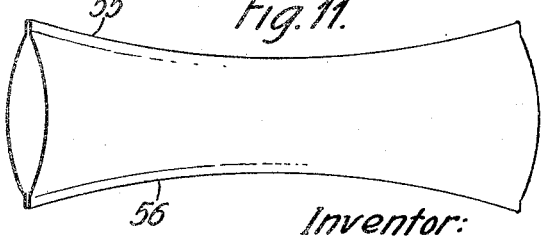

Jan. 31, 1933.  E. H. SMYTHE  1,895,494
SOUND REPRODUCER
Filed Aug. 17, 1926   5 Sheets-Sheet 4
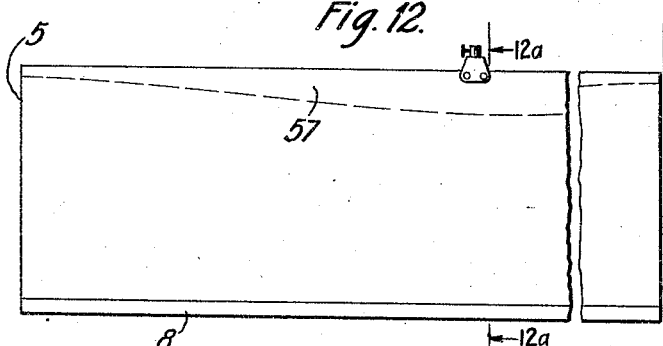
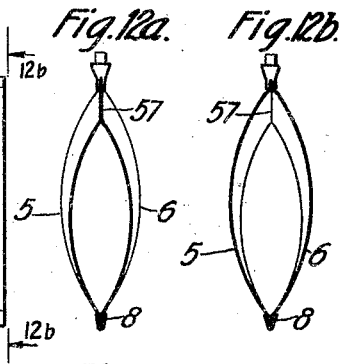
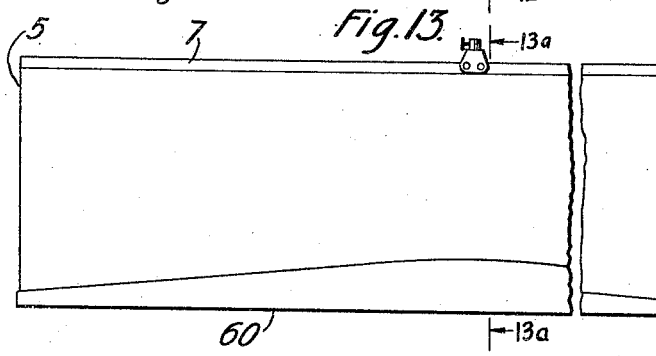
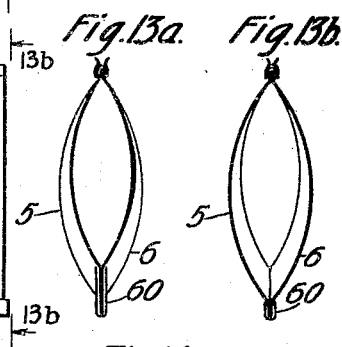
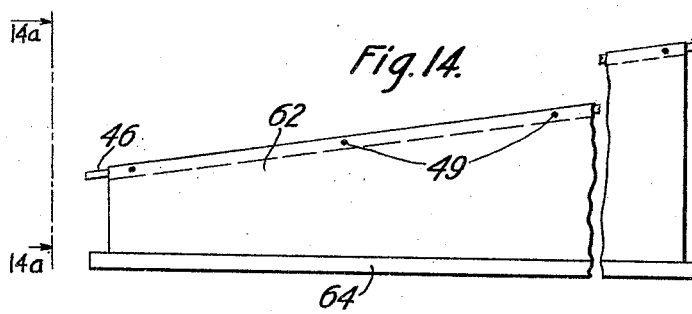
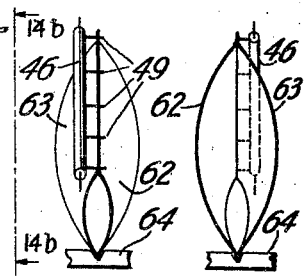
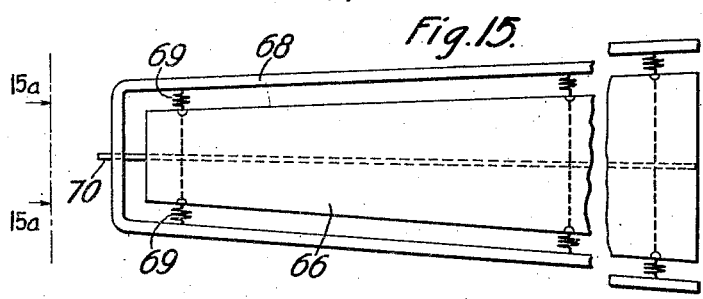
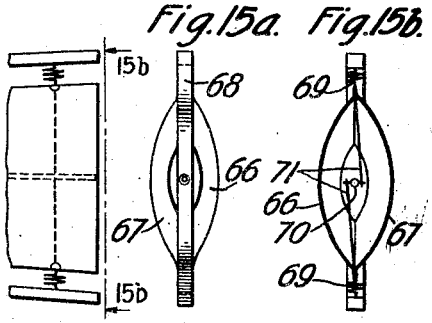
Inventor:
Edwin H. Smythe
by
J. G. Roberts Attorney.

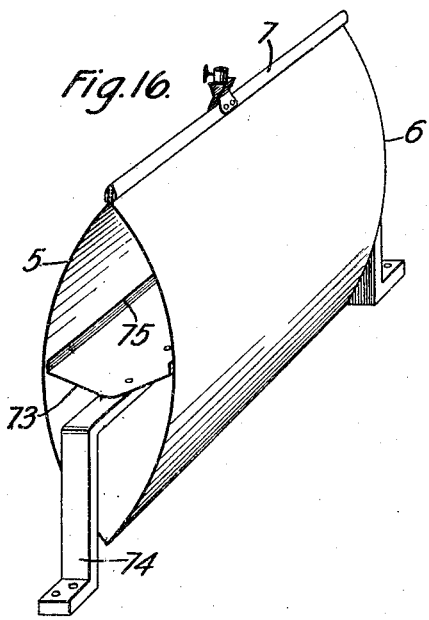
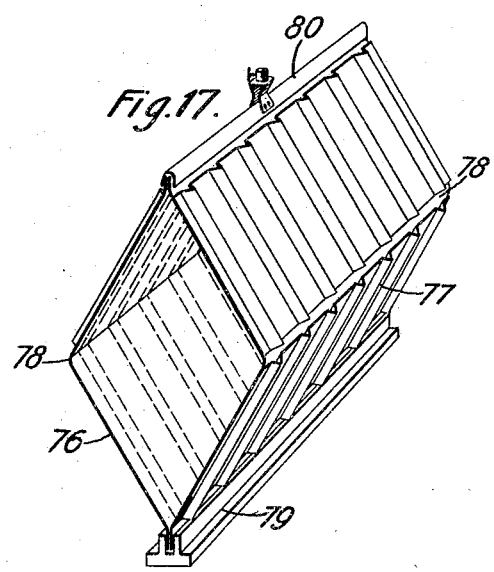
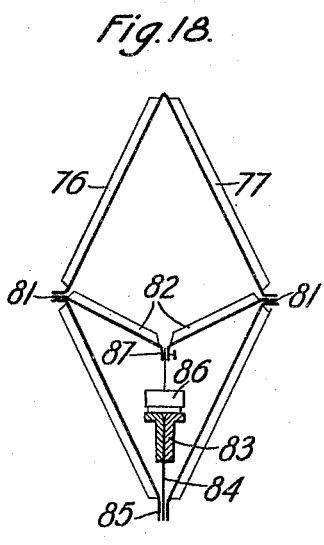
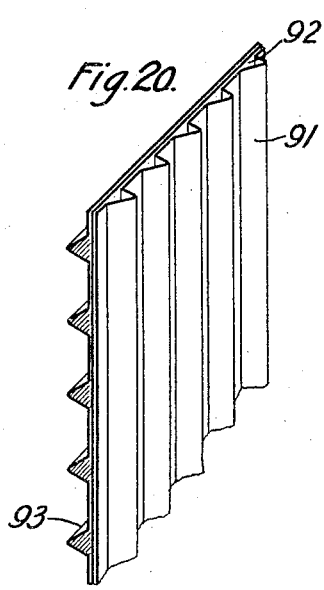
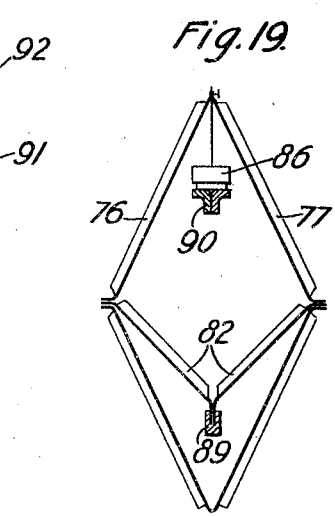

Patented Jan. 31, 1933

1,895,494

UNITED STATES PATENT OFFICE

EDWIN H. SMYTHE, OF EVANSTON, ILLINOIS, ASSIGNOR TO WESTERN ELECTRIC COMPANY, INCORPORATED, OF NEW YORK, N. Y., A CORPORATION OF NEW YORK

SOUND REPRODUCER

Application filed August 17, 1926. Serial No. 129,731.

This invention relates to sound reproducers adapted to act directly on the air and to impart vibrations to the air from relatively large surfaces.

An object of the invention is to reproduce efficiently and faithfully all sounds within the audible range.

A related object of the invention is to distribute sound vibrations uniformly over one or more sound radiating surfaces.

Another object of the invention is to transmit sound waves in phase from a plurality of direct-acting sound radiating surfaces.

In one of its embodiments the invention provides one or more large sound radiating surfaces driven substantially edgewise with respect to the general plane of the surface, the compressional and extensional stresses in the material produced by the driving force being converted into movements of the surface transverse to its plane, these movements setting up sound waves in the surrounding air. Such a structure is relatively rigid in the direction of drive and yielding in a direction transverse thereto.

The invention in another of its embodiments provides a sound radiator in the form of a hollow structure having side walls of light elastic material which are driven toward and away from each other in response to a driving force common thereto. The driving force is applied to the radiator in such a way that the sound vibrations involve relatively large areas and are distributed substantially uniformly over the side walls.

In a particular embodiment of the invention the radiator comprises a flattened tubular member having two side walls which are supported at one edge and are driven in unison at the opposite edge in a direction substantially edgewise or perpendicular to the plane of the support. In a modified form of the invention, each side wall of the radiator is composed of two flat transversely rigid sections joined together to form an extended surface and driven at the point of junction of the two sections. Each side wall may be made transversely rigid by ribs or corrugations, the driving force being applied at the middle of the wall, while the opposite ends of the wall are so mounted as to be constrained against transverse movements.

In one embodiment of the invention the side walls of the radiator are bulged in opposite directions so that the movement of the driven edge toward and away from the support in response to the vibration of the driving member produces a transverse movement of the walls in opposite directions. The walls of the radiator may be alike in area, mass and rigidity, and when actuated by the common driving unit are caused to transmit waves that for the low frequencies are in substantially the same phase over the exterior surfaces and are in the opposite phase over the interior surfaces of the radiator, the resulting air waves of opposite phase being separated from each other by the walls of the radiator to avoid neutralization of their effects. This construction tends to increase the effective sound radiation of the device.

In the embodiment of the invention in which the side walls of the radiator are curved or bulged, the curvature of the walls may be either toward or away from each other, that is, either concave or convex. In one case a movement of the driven edge toward the base or support causes the side walls to approach each other and the volume of the enclosed space to decrease, whereas in the other case a like movement of the driven edge causes the side walls to recede from each other and the volume of the enclosed space to increase. In certain of the embodiments this opposite phase effect of the opposite curvature of the side walls is taken advantage of to balance two such units against each other with oppositely disposed supports and a common driving edge, any movement of which driving edge causes the two units to operate in the same phase with respect to the air pressure waves produced.

In certain forms of the invention the material of the sound radiating surfaces is put under tension or compression longitudinally to control the radiating action of the structures.

In constructing the radiator in accordance with the invention there are a number of factors which may be varied to produce any desired action with respect to frequency response. The walls of the radiator may be made of various materials, of various dimensions, and of various curved and angular relations between the parts, and the weight and stiffness of the walls may be varied to give the radiator the required mass and elasticity constants for transmitting, converting into the required relative movements, and distributing the driving force. A simple and efficient driving member, preferably in the form of a long, light and rigid tube, is also provided for applying the driving force uniformly along an extended edge or intermediate portion of the radiator.

The various features of the invention will be described in connection with the accompanying drawings in which like reference characters designate similar parts in the several figures, and in which:

Fig. 1 is a general assembly side view of the sound radiator with supporting means and motor element;

Fig. 2 is a sectional view taken on the line 2—2 of Fig. 1.

Fig. 3 is a perspective view of a reenforced folded radiator;

Fig. 4 is an end view of a sound radiator having two conical side walls;

Fig. 5 is a perspective view of the device shown in Fig. 4 with the motor element and a portion of the supporting frame omitted for the sake of clearness;

Figs. 5a, 5b and 5c are detail views illustrating methods of cutting away diametrically opposite segments of the radiator of Figs. 4 and 5;

Fig. 6 is a perspective view of a sound radiator formed of a series of double-wall diaphragms having different mass and elasticity characteristics;

Fig. 7 is a perspective view showing a modification of the sound radiator of Fig. 6;

Fig. 8 is a sectional view, taken on the line 8—8 of Fig. 9, of a pair of double-wall diaphragms curved in opposite directions, and means for driving the diaphragms along a common edge;

Fig. 9 is a side view of the device shown in Fig. 8 with a portion of the diaphragm broken away to illustrate the driving unit;

Fig. 9a is a perspective view showing a detail of the driving unit of Figs. 8 and 9;

Figs. 9b and 9c are perspective views showing modifications in the manner of driving the member 46 of Fig. 9a.

Fig. 10 is an end view of a modified structure having two curved radiating surfaces actuated by a common driving unit;

Figs. 11 to 15b, inclusive, show various side and sectional views illustrating different methods of shaping, supporting and driving the sound radiator to obtain different frequency response characteristics;

Fig. 16 is a perspective view of a sound radiator of the general type shown in Figs. 1 and 2, having a modified form of support;

Fig. 17 is a perspective view of a sound radiator having side walls formed of two flat rigid sections;

Figs. 18 and 19 illustrate two modifications of the sound radiator shown in Fig. 17, including modified driving and supporting means;

Fig. 20 is a perspective view showing a wall having longitudinal as well as transverse rigidity, for use in the sound radiators of Figs. 17 to 19.

The sound radiator shown in Figs. 1 and 2 comprises a long hollow structure having two enclosing side walls 5 and 6 of light elastic material, such for example as stiff paper, fastened together along their upper longitudinal edges preferably by means of a rigid binding strip or rib 7 of light material such as duralumin.

The diaphragm comprising the walls 5 and 6 is mounted on the base 9 between a pair of tubular uprights 10, a lower longitudinal rib 8, to which the lower edges of the walls are secured, preferably resting in a groove formed either in the base 9 or in a lead plate 11 which may be embedded in the base to provide a solid support for the lower rib 8. The motor element 12 for actuating the walls 5 and 6 is carried by a support 13 mounted on vertical rods 14 which are supported in the tubular uprights 10. The rods 14 may be locked in any desired vertical position in the uprights 10 by means of suitable screws 15. The motor element 12 may be of the type disclosed and claimed in Patent No. 1,709,571 to H. C. Harrison, granted April 16, 1929. The driving rod of the motor element is connected to the upper longitudinal rib 7 of the radiator by means of a clamping member 16 mounted midway between the ends of the radiator.

Since the walls 5 and 6 of the radiator are curved outwardly from each other a movement of the driven edge 7 toward the supported edge 8 will drive the walls of the radiator away from each other and increase the volume of the space enclosed between them. With a pair of walls 5 and 6 having similar mass and elasticity constants, the device when actuated by low frequency vibrations will act upon the air as a pulsator sending out from the two outer walls air pressure waves of corresponding phase and amplitude, the corresponding waves of opposite phase produced by the inner surfaces of the walls being prevented from direct intermingling with the waves from the outer surfaces by the interposition of the material of the elongated walls of the radiator.

The degree of curvature of the radiating surfaces 5 and 6 may be varied by adjusting the angle at the joining edges of the two walls. Generally, the slighter the normal curvature of these surfaces with respect to the direction of application of the driving force, the greater will be the volume change in the enclosed space between the two surfaces for a given movement of the driving element. As the curvature of the surfaces approaches the semi-circular, the volume change becomes less, and beyond this point the volume change for the same direction and amplitude of movement at the driving point is in the opposite direction. Furthermore, the less the curvature, the greater is the rigidity of the structure in the direction of drive, and correspondingly the greater is the length of wave in the material and the greater is the area involved. Accordingly, the normal curvature of the walls 5 and 6 should be less than semi-circular and preferably of relatively slight curvature. The walls 5 and 6 should also be secured at their driven and supported edges in such a way that the curvature at all points between these edges is in the same direction, as illustrated. This is necessary since any double curvature or buckling of the walls would tend to produce transverse movement of the same surface in opposite directions and thus reduce the amount of radiation of the transmitted waves.

One advantage secured by the above structure is that which arises from the air transformer effect at low frequencies between the inner surface of the double-walled diaphragm and the openings at the ends thereof. Under proper conditions, the relation of the inner surface area to the area of the openings at the ends of the hollow structure will be such as to add air mass reactance to the diaphragm throughout the lower frequency range, and thus permit a relatively stiff diaphragm structure to be employed without loss of the low frequency tones. The transformer ratio may be changed as desired by changing the length or shape of the hollow structure, or both, in order to obtain the required ratio between the area of the active inner surfaces and the area of the opening of the enclosed space into the outer air. Another advantage of this structure lies in the baffle-plate action of the structure in that the portions of the walls more remote from the driving point function as separating walls between the areas of compression and rarefaction on the outer and inner surfaces of the diaphragm.

In the modification of the invention shown in Fig. 3, the diaphragm consists essentially of a sheet of paper, or other suitable light, elastic material 18, folded once without creasing, with its longitudinal edges adjacent and preferably bound together by means of a rigid binding strip or rib of duralumin 7 similar to that described in connection with Figs. 1 and 2. The diaphragm so formed represents a long tube having a generally pear-shaped transverse section. The bottom of the diaphragm may be attached directly to the base, or may be secured to a strip of lead or other heavy material 19 which may be inserted in a slot in the base 9. Cement or other suitable material may be used for securing the diaphragm to the base or if desired pins, rivets (not shown) or other suitable means may be used. The diaphragm is driven at the bound edge 7 substantially edgewise or in a direction perpendicular to the plane of the base 9 and in a manner similar to that described in connection with Figs. 1 and 2. If desired, one or more layers of reenforcing material 20 may be secured, for example, by adhesive material, to either the outer or inner surface of the diaphragm to give the structure such mass and rigidity constants as may be desired, and insure the proper distribution of the driving force to all portions of the diaphragm surface.

Figs. 4 and 5 illustrate a sound radiator of the double cone type constructed in accordance with the invention. In this construction the cones 22 and 23 are cemented together base to base along their peripheral edges. In order to afford the necessary flexibility with respect to transverse movement of the two cones in the direction of their common axis resulting from their edge drive, diametrically opposite end segments are cut away to provide opposite open ends 24 and 25.

Figs. 5a, 5b and 5c illustrate diaphragms of this type having their end segments cut away to a greater or less extent, depending upon the particular frequency response characteristics which it is desired to secure. In Fig. 5a comparatively small openings 24a and 25a are provided by cutting diametrically opposite rounded segments curved toward the center of the cones. In Fig. 5b somewhat larger openings 24b and 25b are provided by cutting end segments in a plane substantially perpendicular to the plane of the supporting base, thus increasing the transverse flexibility of the conical walls and increasing the ratio of the area of the openings to the area of the inner vibrating surfaces. In Fig. 5c the end openings 24c and 25c are considerably larger than in the structures of Figs. 5a or 5b, the open edges of the cones preferably being curved outwardly from the center in order to provide a still different area and stiffness relation. The sound radiator shown in Figs. 4 and 5, having end segments cut away in any suitable manner, may be actuated in a manner similar to that illustrated in Figs. 1 and 2, and its diametrically opposite edge may be supported directly on the base 9, or on an intervening block of heavy material 19. By the application of the driving force at a single point along the upper edge, in a direction perpendicular to the plane of the support, the two cones are caused to bulge and flatten in opposite phase with each other, and thus for low frequencies to act like a pulsator the volume of which is increased and diminished by the application of the driving force.

In Fig. 6 a series or pile of tubular double-wall diaphragms 27, 28 and 29 are so formed that the mass of the successive tubes of the series increases from the driving point toward the support, while the rigidity of the successive tubes diminishes from the driving point toward the support. The adjoining edges of the several tubes of the series are constrained transversely by means of horizontal cords 30 drawn taut between opposite supporting frames 31. The lowermost tube 29 of the series may be mounted on a support 19 in the base 9 in a manner similar to that illustrated in Fig. 3, or may be mounted directly on the base. The driving force is applied to the longitudinal rib 7 of the uppermost tube 27 in a manner similar to that illustrated in Figs. 1 and 2. In this form of structure, as the frequency of the applied vibrations decreases the energy radiation will progressively involve the larger and less rigid tubes toward the bottom of the pile.

The sound radiator shown in Fig. 7 differs from that shown in Fig. 6 in that the ends of the tubular diaphragms 33, 34 and 35 are cut obliquely in such a direction as to converge from the bottom toward the top, the structure thus progressively increasing in length from the upper small tube 33 to the lower large tube 35, and the mass and elasticity characteristics changing accordingly. The means for supporting and driving the radiator are similar to those employed in connection with the structure of Fig. 6.

Figs. 8 and 9 illustrate a sound radiator in which a diaphragm unit 38 having outwardly curved walls is associated edge to edge with a diaphragm unit 39 having inwardly curved walls, means being provided for effecting an equalized distribution of the driving force along the common edge of the diaphragms. The lower edges of the diaphragm 39 are spread apart and supported on the base 41. The upper edge of the diaphragm 39 and the lower edge of the diaphragm 38 are joined together in any suitable manner at their point of contact or, in fact, each wall of the radiator may be formed of a single sheet of material shaped in the manner shown and pinched together and cemented along the central line of demarcation between the outwardly curved surfaces and the inwardly curved surfaces. The upper longitudinal edges of the diaphragm 38 are fastened together by means of a longitudinal rib or binding strip 42 which is supported by means of a bar 43 extending between and mounted on a pair of angular end standards 44.

The diaphragm units 38 and 39 are thus balanced against each other with respect to compressional or extensional forces which may be applied between their supports or developed in the material of which they are formed. Inasmuch as the reverse curvature of the walls of each diaphragm with respect to the other causes the two diaphragms to operate in exactly opposite phase with respect to any force applied to their common edge in the direction of either of their respective edges, the application of the driving force at the junction edge between the two diaphragm units causes all the outer surfaces of diaphragm units to operate in the same phase with respect to the waves of compression or rarefaction resulting from any movement of the driving force in one direction or the other, and all the inner surfaces simultaneously to operate in the opposite phase.

The driving unit comprises a very light rigid and thin-walled tube 46 of duralumin or similar material which is arranged along the junction point between diaphragms 38 and 39 and secured at its ends to standards 40. The tube 46 may be supported by means of a torsion connection in the form of stiff torsion wires, or light, strong, narrow spring strips 47 riveted or otherwise fastened to the preferably flattened end walls of the tube 46 and clamped firmly in clamping members 48 mounted on the standards 40, preferably in such a way that the rotatable tube system is held under a considerable degree of longitudinal tension.

At intervals along the tube 46 there may be a plurality of light projecting pins 49, as more clearly shown in Fig. 9a, which project through or are secured in any suitable manner to the junction edge between the two diaphragms, or, if desired, the junction edge may be fastened directly to the surface of the tube by cement or otherwise. The driving unit or motor element is so connected to the tube 46 as to vibrate it torsionally or rotationally about its longitudinal axis. In the particular form shown, at the center of the tube 46 are provided a pair of diametrically opposite arms 50 projecting in a plane transverse to that of the diaphragm connecting pins, the ends of the arms 50 being connected in effect to opposite ends of the armature of the motor element 51. If desired, the driving rod extending from the armature of the usual motor element may be attached tangentially to the surface of the tube 46, as shown in Fig. 9b or to a single radial pin projecting from the surface as shown in Fig. 9c. The motor element 51 may be of the type described in connection with Figs. 1 and 2.

The power distributing tube and associated mechanisms described above provide a convenient means for effecting a line drive, or longitudinal distribution of the driving forces, without unduly increasing the material mass of the moving system. The torsional mounting of the tube makes it possible to control the elasticity factor of the moving system, and at the same time provides a satisfactorily rigid fulcrum to react against the forces applied to and distributed from the periphery of the tube. This power distributing system may also be employed in connection with the various other types of sound radiators herein described, where it is necessary to apply the driving force along an extended edge or line.

The sound reproducer shown in Fig. 10 comprises a pair of sound radiating surfaces 52 and 53, each of which is curved twice in opposite directions and held under a state of elastic compression between upper and lower supports 54 and 54'. These surfaces are driven at the middle by means of an elongated power distributing tube 46, similar to that shown in Figs. 8 and 9, extending lengthwise between the two surfaces. The movement of the driving tube tends to increase the curvature of either the upper or lower portion of each surface, as the case may be, and flatten out the other portion of each surface. If desired, one of the surfaces 52 or 53 may be dispensed with and only one radiating surface employed. In this construction the motor element may be connected to either end of the driving tube 46, instead of being connected to an intermediate point of the tube, the opposite end being torsionally mounted as in Figs. 8 and 9.

Figs. 11 to 15b, inclusive, illustrate, among other features, that of controlling the frequency response characteristics of a hollow double-wall diaphragm by progressively varying the mass and rigidity constants and the area. In Fig. 11, the outwardly curved walls of the diaphragm are flared to change progressively the mass and rigidity characteristics of the walls, and to produce an enclosed space which increases in area from the center toward the open ends. The walls of the diaphragm are cemented or otherwise fastened together longitudinally along the edges 55 and 56, the edge 55 being driven and the edge 56 being supported in any suitable manner such as described above.

Figs. 12, 12a and 12b illustrate a method of arranging the contour of the cement line between the walls of the radiator to give any desired mass, rigidity and volume characteristics at different sections of the radiator. This structure is similar to that shown in Figs. 1 and 2 except that the driven edges of the walls 5 and 6 are cemented together in such a way that the margin of the cement line 57 is of greatest breadth at the center of the diaphragm and decreases gradually toward the open ends. Fig. 12a is a sectional view looking into the center of the hollow structure, showing the inner walls pinched together to form a comparatively small enclosure at this point. Fig. 12b is a view looking into the open end of the hollow diaphragm showing the flare from the outer end toward the center of the diaphragm.

Figs. 13, 13a and 13b illustrate a sound radiator similar to that shown in Figs. 1 and 2, but in which the binding strip or rib at the supported edge of the radiator is shaped to progressively alter the divergence of the walls. In this construction the binding strip or rib 60 fastens the bottom edges of the walls 5 and 6 together in such a way that the volume of the space enclosed by the walls is smallest at the center of the diaphragm and increases to a maximum at the open ends. The progressive pinching effect of the binding strip 60 upon the walls of the diaphragm is clearly illustrated in Figs. 13a and 13b which are views looking into a middle section and the open end of the diaphragm, respectively.

The sound radiator illustrated in Figs. 14, 14a and 14b comprises a pair of enclosing walls 62 and 63 having their upper driven edges tapered longitudinally. The upper driven edges and the lower supported edges of the walls are fastened together in any suitable manner, as by means of cement. The lower bound edge of the hollow radiator is mounted in a slot or groove in the base 64. The upper bound edge of the radiator may be driven in a manner similar to that described in connection with Figs. 8 and 9, and accordingly only so much of the driving system is shown as is necessary to explain the operation of the device. Fig. 14a is an end view looking into the small end of the radiator showing the outer surfaces of the flared walls 62 and 63, and Fig. 14b is an end view looking into the large end of the radiator from which point only the ends of the outer walls 62 and 63 may be seen.

Figs. 15, 15a and 15b illustrate a hollow diaphragm having side walls 66 and 67 the upper and lower edges of which are so formed as to produce a taper or flare lengthwise of the diaphragm. The diaphragm is mounted between the upper and lower arms of a solid supporting frame 68 by means of spiral springs 69 designed to apply tension in the direction of the major transverse axis of the diaphragm. The driving element comprises a driving tube 70 which extends longitudinally through the center of the diaphragm, and is adapted to be driven torsionally by means of a driving unit, similar to that described in connection with Figs. 8 and 9, which may be connected to the projecting end of the driving tube or may be mounted inside the hollow diaphragm. A plurality of arms 71 connect the driving tube 70 to diametrically opposite portions of the inner joined edges of the walls 66 and 67 in the manner shown in Figs. 15 and 15b, and serve to convert the torsional movement of the driving tube 70 into expansional and contractional movement of the diaphragm.

Fig. 16 illustrates a sound radiator comprising a double-walled diaphragm of the type described in connection with Figs. 1 and 2, provided with a modified form of support. The support consists of a bowed bridging member 73 mounted on an angular supporting bar 74 which extends longitudinally through the diaphragm. Opposite up-turned edges 75 of the bridging member 73 are fastened, for example by means of cement, to the inner surfaces of the diaphragm walls 5 and 6. The driving force is applied to the upper bound edge 7 of the radiator in a manner similar to that described in connection with Figs. 1 and 2, causing the bridging member 73 to flatten and bow in response to the transverse movement of the diaphragm walls. If desired, the bridging member 73 may be made of a sheet of light stiff material similar to that of the walls of the diaphragm, in which case the transverse component of the movement due to the driving force will cause sound radiation directly from the surfaces of the bridging member, while the longitudinal component of movement that moves the walls 5 and 6 in opposite phase to produce a pulsator action will cause sound radiation from the surfaces of these walls. The bridging member 73, however, in this particular embodiment, need not be a radiator of sound energy, but may serve merely to cooperate with the driving edge in causing the transverse movement of the balanced walls of the diaphragm. In the performance of this function it may be replaced by open arms or toggle lever connections between the supporting bar 74 and the side walls. By attaching the supporting member along the middle of the side walls, the lower half of the tubular member is left free to execute movements symmetrical with those of the upper half in response to the vibrations applied to the upper driving edge.

Fig. 17 illustrates a modification of the invention in which the side walls of the diaphragm, instead of being curved, are each composed of two flat transversely rigid sections. The side walls 76 and 77 may each be constructed in two substantially rectangular sections, and each section may comprise two sheets of material such as light stiff paper. One of the sheets of material of each section of the wall is preferably ridged or corrugated at intervals, the corrugations being more or less closely spaced, while the other sheet of material is flat and is pasted or cemented to the corrugated sheet. The portions of the corrugated sheet lying between adjoining corrugations are in a flat plane, thus producing a composite wall with one flat surface and one corrugated surface with the corrugations spaced at any desired interval, and the wall being light and having a very satisfactory degree of transverse rigidity. The borders of the flat sheet of each wall section may project beyond the borders of the corrugated sheet at each edge, the adjoining edges of the flat sheets being fastened together in any suitable manner, as by means of cement, to provide hinged connections 78 between adjoining transversely rigid sections. The lower edges of the walls 76 and 77 are fastened together in any suitable manner, and may be supported in a slotted base 79. The upper edges of the diaphragm walls are fastened together by means of a longitudinal rib 80 which is adapted to be driven in a direction perpendicular to the plane of the support 79 in a manner similar to that described in connection with Figs. 1 and 2, or the junction edge may be driven by the power distributing tube or torsional line drive element hereinbefore described.

Fig. 18 illustrates a composite system of sound radiating surfaces embodying elements of a number of the forms of the invention hereinbefore described. In this construction the walls of the system are preferably of the form illustrated in Fig. 17, made transversely rigid by ridges or corrugations.

The side walls 76 and 77 are made up of four rectangular transversely rigid sections secured together at their adjoining edges. Bridging diametrically opposite junction points or edges of side walls 76 and 77 is a sound radiating surface consisting of transversely rigid sections 82 joined together and driven at an intermediate point 87 by the motor element 86. This motor element is mounted upon the supporting bar 83, which bar extends lengthwise of the structure and carries an extension 84 through the medium of which the whole radiating system of the diaphragm is supported, the lower junction line of the two side walls 76 and 77 being fastened to the extension 84 along the line 85. All of the members of this diaphragm system cooperate in the production and radiation of sound. The movement which is imparted to the transverse radiating surface 82 by the motor element 86 causes the transverse portion 82 to act as a sound radiator, and also to impart transverse movement to the side walls 76 and 77, this movement also resulting in the radiation of sound waves from the side walls. It may be seen that the sound radiator of Fig. 18 represents the combination of a number of simpler elements which have the capacity of operating independently of other elements of the combination as sound radiators. For instance, the upper halves of the side walls 76 and 77 may be removed from the combination, and the part which is left, consisting of the lower half of each of the side walls joined to the outer edges of the transverse radiating member 82 constitutes an operative radiating system. In this simpler form, the vibrations applied along the central line of the transverse member 82 cause it to radiate sound directly, and also to produce a component of motion transverse to the direction of drive that causes the movement of the lower side wall members and the radiation of sound from them. Or if the lower side wall portions in the simplified component of the structure of Fig. 18, just considered, are deprived of their sound radiating capacity and retain merely their capacity for affording supports for the outer edges of the transverse radiating member 82 which constrain the outer edges at 81 against transverse movement or movement in the direction of the driving force, the transversely rigid member 82 is then the sole radiator of sound in the system. The system of Fig. 18, therefore, may be seen to consist of a number of simple elements capable of acting independently as sound radiators, or capable of combination in the form illustrated to combine their sound radiating effect. The driving force may be applied at the middle of the transverse member 82, if desired, by means of the elongated power distributing tube disclosed in connection with the forms of Figs. 8, 9 and 9a.

The sound radiator shown in Fig. 19 is generally similar to the structure shown in Fig. 16 with respect to the point of application of the driving force and the means for supporting the moving system, and resembles the structure shown in Fig. 18 in the matter of the nature of the radiating surfaces employed. In Fig. 19, the corrugated bridging member 82 is supported at its center by means of a bar 89 similar to the bar 74 shown in Fig. 16, and the motor element 86 which serves to actuate the diaphragm at the junction point of the upper joined edge of the walls is mounted on a similar bar 90. In this construction the constraint in the direction of the driving force and the freedom transverse to the direction of the driving force afforded by the bridging member 82 cause the lower sections of the diaphragm walls to execute a movement for low frequencies symmetrical with the movements of the upper sections of the walls. The transverse component of movement of the side walls is accentuated by disposing the elements 82 of the bridging member at a more acute angle with respect to each other.

The walls of the diaphragms shown in Figs. 17, 18 and 19 may be constructed in the manner shown in Fig. 20 to provide longitudinal as well as transverse rigidity. In this construction, a sheet of material 91 having vertical corrugations or ridges is pasted on one face of a flat sheet of material 92, and a second sheet 93 having horizontal corrugations is pasted on the opposite face of the flat sheet 92. The spacing of the corrugations may be in accordance with the desired degree of rigidity while still leaving fairly wide flat plane portions for convenient and secure attachment of the corrugated sheets 91 and 93 to the flat sheet 92.

Various structural modifications may be made in the sound radiators described above without departing from the scope and spirit of the invention. In all of the modifications illustrated, for example, the hollow diaphragms may be so mounted that the line of support and the line of drive are vertical instead of horizontal. In some cases where very large diaphragms are employed, a vertical support and vertical drive may have the advantage of preventing any biasing of the driving armature that might result from the weight of the diaphragm parts that are to be moved.

The forms of the invention shown in Figs. 16, 17, 18 and 19 have been claimed in my divisional application Serial No. 330,172, filed January 4, 1929, and the form of the invention shown in Fig. 20 has been claimed in my divisional application Serial No. 327,732, filed December 21, 1928, issued October 20, 1931, as Patent 1,828,513.

What is claimed is:

1. A sound reproducer comprising a fixed support, a hollow diaphragm having one edge mounted on said support, and means for driving the opposite edge of said diaphragm in a to and fro direction with respect to said one edge and in a plane therewith.

2. A sound reproducer comprising a fixed support, a direct-acting diaphragm comprising two curved surfaces having two of their edges joined together and having one junction attached to said support, and means for driving the opposite junction of said diaphragm toward and away from said support in response to sound vibrations.

3. A sound reproducer comprising a fixed support, a diaphragm of light elastic material having one edge attached to said support, a rib on the opposite edge of said diaphragm of such stiffness that vibrations applied thereto are distributed substantially uniformly to the surface of said diaphragm, and a driving member connected to said rib the movements imparted to the rib by said driving member being co-planer with said edges.

4. A sound reproducer comprising a long tubular member having its transverse axes of unequal dimensions, and means for applying sound vibrations simultaneously to the entire length of said member in the direction of its major transverse axis.

5. A sound reproducer comprising a long tubular member of light elastic material having a longitudinally stiffened portion, the transverse axes of said member being of unequal dimensions and means for applying sound vibrations to said stiffened portion in the direction of the major transverse axis of said member.

6. A sound reproducer comprising a hollow open-ended structure with yielding walls, and means for driving said walls in opposite directions in response to sound vibrations.

7. A sound reproducer comprising a plurality of yielding walls joined together along an edge, and means acting on said edge to drive said walls transversely in opposite directions.

8. A sound reproducer comprising a hollow structure having oppositely disposed curved walls joined together along two edges, a support for said structure to which one of the joined edges of said walls is secured, and means for driving the other joined edges of said walls toward and away from said support in response to sound vibrations.

9. A sound reproducer comprising a support, a pair of elastic walls bulged in opposite directions and mounted on said support in a manner to form a hollow open-ended structure, and means for driving said walls toward and away from each other in response to sound vibrations.

10. A sound reproducer comprising a hollow structure having similar yielding walls different portions of which have different mass and elasticity characteristics, and means for driving said walls toward and away from each other in response to sound vibrations.

11. A sound reproducer comprising a hollow structure having at least two similar enclosing walls bulged in opposite directions, said walls having different mass and elasticity characteristics at different portions thereof, and means for driving said walls in opposite directions in response to sound vibrations.

12. A sound reproducer comprising an elastic diaphragm having opposite edges supported under strain and means for driving said opposite edges of said diaphragm toward and away from each other.

13. A sound reproducer comprising a sound radiating surface having an edge mounted on a fixed support, a driving member for driving an opposite edge of said surface toward and away from its supported edge, and means associated with said driving member to exert a restoring force on said surface.

14. A sound reproducer comprising an elastic diaphragm having opposite edges supported under strain, means for driving said diaphragm including a power distributing member actuated in response to sound vibrations, and an elastic support for said member to exert a restoring force thereon.

15. A sound reproducer comprising a diaphragm bulged in opposite directions and having opposite edges supported under strain and means for driving said diaphragm in an edgewise direction in response to sound vibrations.

16. A sound reproducer comprising a support, a diaphragm bulged in opposite directions and partially confining a body of air and having one edge mounted on said support, and means for driving another edge of said diaphragm toward and away from said support, the movement of the driven edge being in the direction of a plane through both edges.

17. A sound reproducer comprising a support, an elastic diaphragm bulged in opposite directions, means for supporting opposite edges of said diaphragm under tension, means for driving said diaphragm including a power distributing member actuated in response to sound vibrations, and an elastic support for said member to exert a restoring force thereon.

18. A sound reproducer comprising a pair of sound radiating surfaces bulged in opposite directions and having their edges joined together, means for flexibly supporting said joined edges, and means attached to the edge portion of said surface for driving said surfaces in response to sound vibrations.

19. A sound reproducer comprising a hollow structure having at least two enclosing walls with their edges joined together, a plurality of springs supporting said joined edges and applying tension thereto, and a driving element within said hollow structure and connected to said joined edges to drive said walls in response to sound vibrations.

20. In a device of the character described, a diaphragm consisting of adjoining curved portions, a grooved vibratory rib embracing the adjacent edges of said diaphragm portions, and means for securing the other edges of said diaphragm portions.

21. In a device of the character described, a diaphragm consisting of two curved portions, a U-shaped rib into which extend the adjacent edges of said diaphragm portions, said rib being free to vibrate in a direction transverse to its length, and electrical means associated with said rib.

In witness whereof, I hereunto subscribe my name this 12th day of August A. D., 1926.

EDWIN H. SMYTHE.